(12) United States Patent
Cazier

(10) Patent No.: US 6,657,661 B1
(45) Date of Patent: *Dec. 2, 2003

(54) DIGITAL CAMERA WITH GPS ENABLED FILE MANAGEMENT AND A DEVICE TO DETERMINE DIRECTION

(75) Inventor: Robert Cazier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/596,703

(22) Filed: Jun. 20, 2000

(51) Int. Cl.$^7$ ............... H04N 5/76; H04N 7/00; H04N 5/222

(52) U.S. Cl. ............... 348/231.2; 348/231.3; 348/552; 348/333.02

(58) Field of Search ............... 348/231.2, 231.3, 348/231.5, 239, 333.02, 552

(56) References Cited

U.S. PATENT DOCUMENTS

| | | | | |
|---|---|---|---|---|
| 5,267,042 A | * | 11/1993 | Tsuchiya et al. | 358/209 |
| 5,335,072 A | * | 8/1994 | Tanaka et al. | 348/232 |
| 5,671,451 A | * | 9/1997 | Takahashi et al. | 396/310 |
| 5,844,570 A | * | 12/1998 | Curtright et al. | 345/629 |
| 5,870,741 A | * | 2/1999 | Kawabe et al. | 707/5 |
| 6,005,679 A | * | 12/1999 | Haneda | 358/453 |
| 6,012,028 A | * | 1/2000 | Kubota et al. | 704/260 |
| 6,037,936 A | * | 3/2000 | Ellenby et al. | 345/764 |
| 6,133,947 A | * | 10/2000 | Mikuni | 348/143 |
| 6,181,878 B1 | * | 1/2001 | Honda | 396/310 |
| 6,222,583 B1 | * | 4/2001 | Matsumura et al. | 348/113 |
| 6,222,985 B1 | * | 4/2001 | Miyake | 386/117 |
| 6,437,797 B1 | * | 8/2002 | Ota | 345/638 |
| 6,462,778 B1 | * | 10/2002 | Abram et al. | 348/239 |
| 6,469,698 B2 | * | 10/2002 | Fukahori | 345/204 |

FOREIGN PATENT DOCUMENTS

| | | | | |
|---|---|---|---|---|
| JP | 09027937 A | * | 1/1997 | H04N/5/765 |
| JP | 10013720 A | * | 1/1998 | H04N/5/225 |
| JP | 11017908 A | * | 1/1999 | H04N/1/21 |
| JP | 11083477 A | * | 3/1999 | G01C/11/00 |
| JP | 411072348 A | * | 3/1999 | H04N/5/225 |
| JP | 11112918 A | * | 4/1999 | H04N/5/765 |
| JP | 11284939 A | * | 10/1999 | H04N/5/765 |
| JP | 11295802 A | * | 10/1999 | G03B/17/24 |
| JP | 2001169164 A | * | 6/2001 | H04N/5/225 |
| WO | WO 99/18732 | * | 4/1999 | H04N/7/18 |

OTHER PUBLICATIONS

Robert Cazier; Hewlett–Packard Company pending application; HP Docket No. 10003135–1; title: "A Digital Camera With GPS Enabled File Management;" filed Jun. 20, 2000.

* cited by examiner

Primary Examiner—Wendy R. Garber
Assistant Examiner—John M Villecco
(74) Attorney, Agent, or Firm—Steven L. Webb

(57) ABSTRACT

A digital system that uses a global positioning system (GPS) and a device to determine direction to help name the files and/or the file location of the images captured by the device can help manage the large number of files created by the device. The digital system containing a photo-sensor, an image storage area, a GPS system, a GPS database, a device to determine direction, and a processor.

19 Claims, 2 Drawing Sheets

DIGITAL CAMERA WITH GPS ENABLED FILE MANAGEMENT AND A DEVICE TO DETERMINE DIRECTION

FIELD OF THE INVENTION

The field of this invention relates to a digital camera and more specifically a digital camera that uses a global positioning system (GPS) and a device to determine direction to help name the images.

BACKGROUND OF THE INVENTION

Digital cameras create a large number of files. These files can be audio files, thumbnails or full digital images. Currently these files are named based on a default name given by the camera manufacture, for example DSC00001.jpg. Most digital cameras today can store a large number of these images. After taking pictures the user is presented with a list of these files with names that have no meaning to the user, for example DSC00001.jpg, DSC00002.jpg, DSC00003.jpg, DSC00004.jpg etc. When the user wants to share, print, or display a particular image, the user has to open and look at each file until the desired image is located.

Some cameras allow the user to rename the file but with the limited user interface available on most digital cameras, renaming the file is difficult and time consuming.

There is a need for a digital imaging system that can name the image files with a name that can help the user locate and organize the images that have been captured.

SUMMARY OF THE INVENTION

A GPS and compass enhanced digital imaging device can improve the naming and retrieval of image files. The names of the files created by the digital imaging device would be based, in part, on the name of the location and the direction the camera was facing when the file was created.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

A digital imaging system that can name the image files it creates by using the name of the location and the direction the camera was facing when the file was created can greatly enhance the users ability to print, share, or display a particular image.

Figure 1:
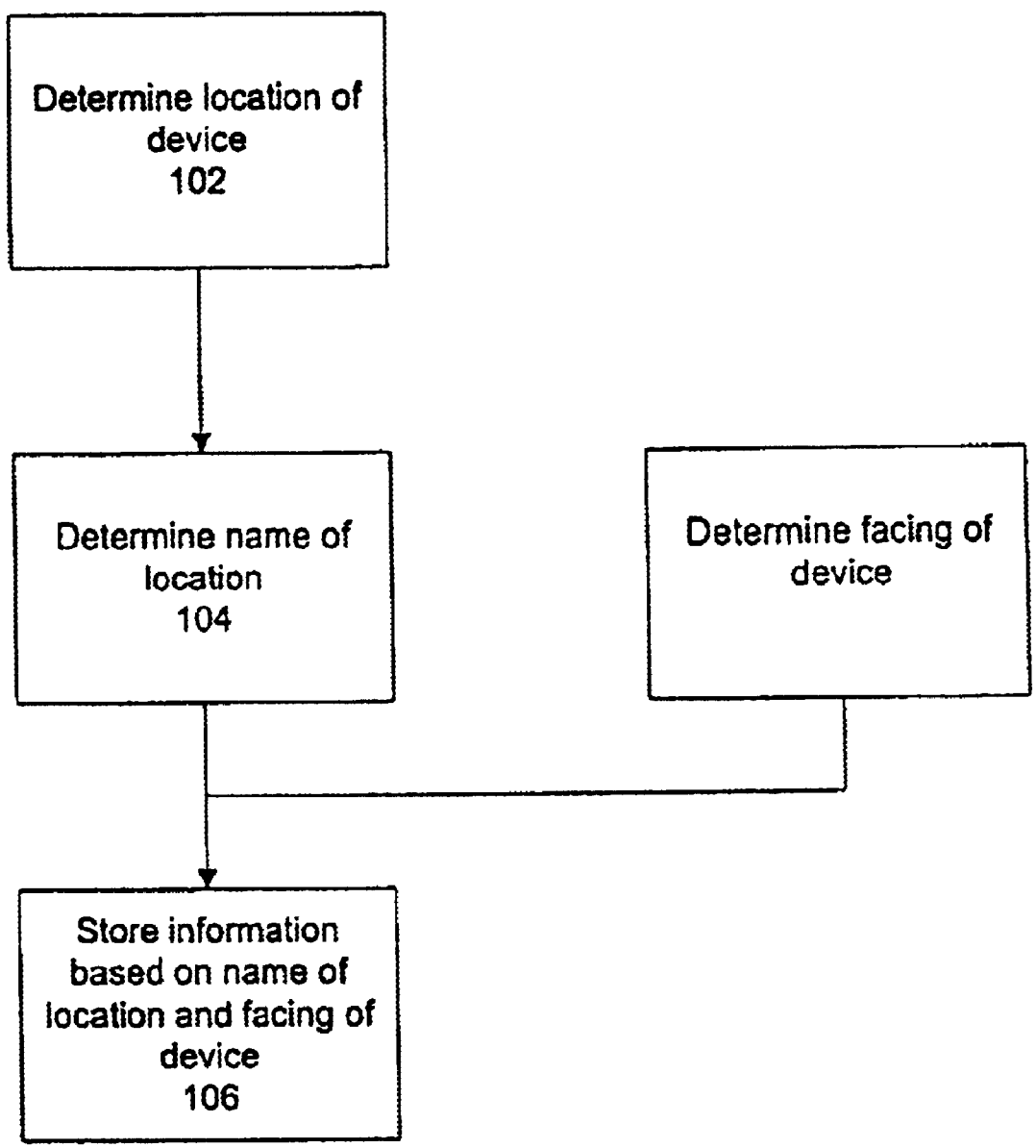
FIG. 1 is a flow chart for storing an image, based on the name of the location and the direction the camera was facing when the image was created in accordance with the present invention.

The global positioning system (GPS) is a system that allows a GPS device to determine the longitude and latitude (FIG. 1, 102) of the device to within approximately 3 meters, anywhere in the world. Today some digital cameras have GPS auxiliary devices that allow the digital camera to embed the longitude and latitude information into the image or save the longitude and latitude as meta-data in the image file. This longitude and latitude information is not very user friendly. Most people do not know the location name that corresponds to any given longitude and latitude.

Figure 2:
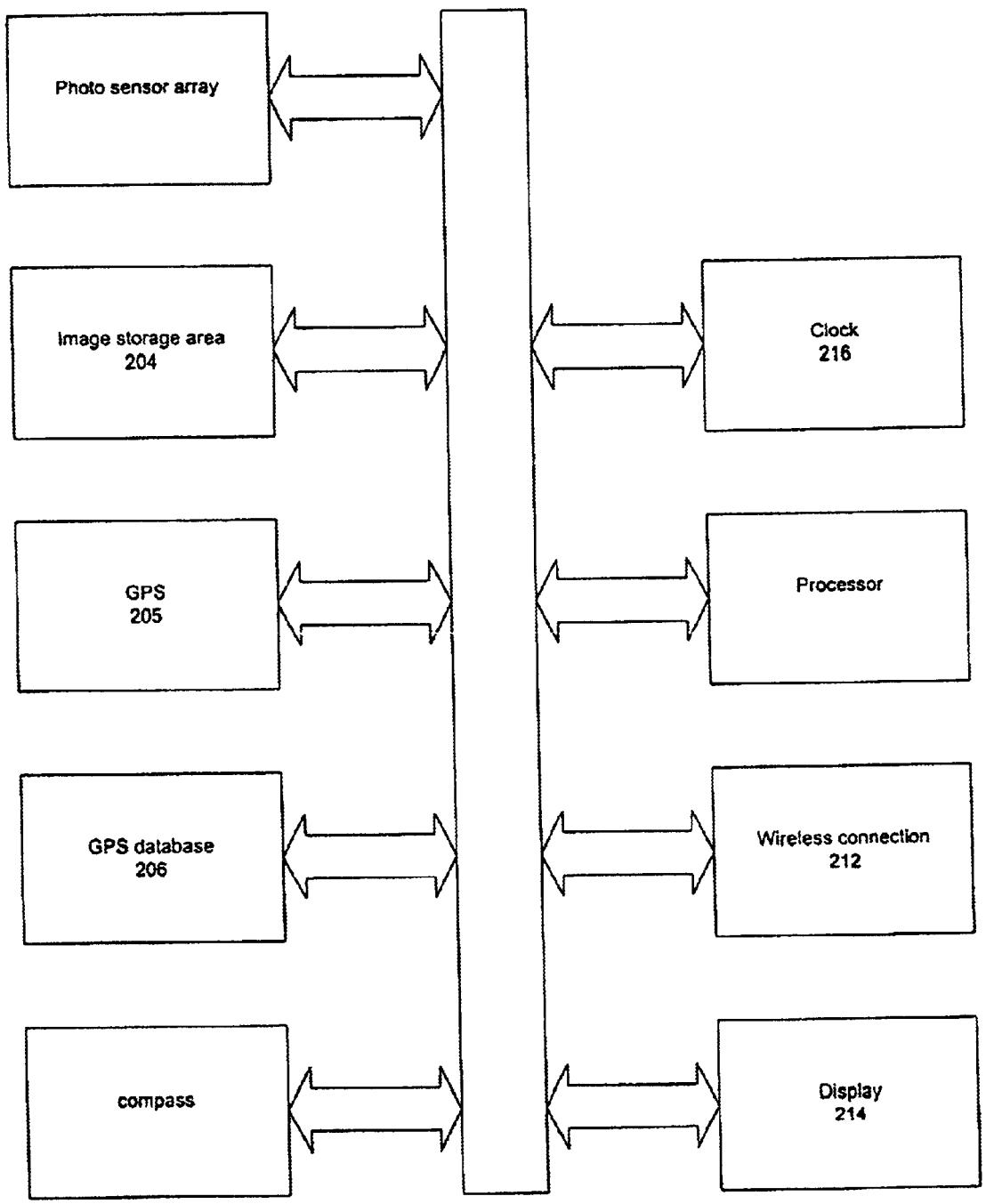
FIG. 2 is a block diagram of a digital imaging system with a GPS and compass enabled file management in accordance with the present invention.

A GPS database is a database (FIG. 2, 206) that has a set of names that correspond to a set of longitude and latitudes. There are many different GPS databases. Some databases are sets of names that correspond to roads in an area, for example the roads in the State of Colorado. Some GPS databases have sets of names for each town and city in an area. One GPS database has a set of names that correspond to the range, township, and section for the United States. Some GPS databases are large. Typically these large GPS databases are segmented into areas. For example, a large GPS database for the U.S. is segmented by States. Each segment can be loaded or used independent from the other segments. Once a GPS device determines the longitude and latitude of the device a GPS database can be used to translate the longitude and latitude information into the name of the location (104), for example the name of the city or the name of the street address corresponding to the longitude and latitude information. Some remote areas in the U.S. are not near any cities or roads, in these cases the name of the range, township and section could be used. Another option for remote areas is to name them relative to the nearest landmark, for example 3 miles north west of the north rim of the Grand Canyon.

Once a name of the location (FIG. 1, 104) has been determined, that information can be used to create a file name and/or path (FIG. 1, 108) that helps a user remember where that file was created. Let's say a user went to Hawaii for vacation and took a number of pictures. One way the location name can be used is to create a number of different directory levels, for example a level for the state, a level for the city, and a name for the location in the city. For example the user that went to Hawaii would have a number of image named as follows:

Hawaii/Maui/East Beach.jpg
Hawaii/Hawaii Kona.jpg
Hawaii/Kauai/Waimea Canyon.jpg
Hawaii/Kauai/Beach.jpg
Hawaii/Kauai/Inland.jpg This is only one example of the many different levels that could be created.

Another way the location information can be used is to name the file in a sentence structure, for example "Waimea Canyon on the island of Kauai in the State of Hawaii". When more than one image is captured at the same location a number can be added to the file name, for example "Waimea Canyon01". Another method of differentiating files that were taken at the same location is to use the internal clock in the digital imaging device to determine when the images were captured, for example "Waimea Canyon at 5:37 pm on Jul. 1, 2000". The time stamp could be used in the file names even when only one image is captured at one place. The time stamp feature could be turned on or off by the user.

The file names could be set to long names or short names. When the file names are set to long names the file name would contain the full location information, for example "Waimea Canyon, Kauai Hi., U.S.A.". When the time stamp feature is enabled the long file name would include when the image was captured, for example "Waimea Canyon, Kauai Hi., U.S.A. at 5:37 pm on Jul. 1, 2000". When the file names are set to short names, only a subset of the location information would be included, for example "1234 Main Street". With the time stamp feature enabled a short file name could look like "1234 Main Street 5:37 pm".

A compass is a device that can determine the direction a device is facing based on the magnetic field of the earth. Other devices can be used to determine the direction a device is facing, for example a gyroscope. A digital imaging device that can determine the direction when an image is captured or created can be used to add more information to the name of the image. An example of a set of files all taken from one location but in different direction could be as follows:

Empire State building facing West.jpg
Empire State building facing North West.jpg
Empire State building facing North.jpg
Empire State building facing North East.jpg The time stamp could be used in conjunction with the facing information if the user desired.

In one embodiment of the present invention the digital imaging device would contain a GPS device (204), a device to determine the direction, and a full GPS database. A full GPS database is one that has a name that corresponds to every location in the world, at some level of granularity. One example granularity level would be a name corresponding to every square mile (a section).

In another embodiment, the digital imaging device would contain a GPS device (204), a device to determine the direction, and a full land GPS database. A full land GPS database is one that has a name that corresponds to every location on land in the world, at some level of granularity.

In another embodiment, the digital imaging device would contain a GPS device (204), a device to determine the direction, and a segment of a large GPS database. The segment of the large GPS database could be changed by uploading a new segment into the digital imaging device.

In another embodiment, the digital imaging device would contain a GPS device (204), a device to determine the direction, and a small or local GPS database, for example a database for just one state in the U.S.

In another embodiment, the digital imaging device would contain a GPS device (204), a device to determine the direction, and a wireless connection to a remote GPS database, for example a wireless connection to the Internet.

In another embodiment, the digital imaging device would contain a device to determine the direction and be connected to a GPS device (204). The location coordinates could be determined in two different ways. One way is that each time an image is captured the digital imaging device would retrieve the location coordinates from the GPS device. Another way is that any time the GPS device detected a change in location, new location coordinates would be sent to the digital imaging device.

In another embodiment, the digital imaging device would contain a GPS device and a device to determine the direction. When an image is captured and stored the location and direction of the image would also be stored. When the image is transferred from the digital imaging device a GPS database would be accessed and the image file name would be changed to include the information from the name of the location and the direction of where the image was captured.

In another embodiment, the digital imaging device would contain a GPS device and a device to determine the direction. When an image is captured and stored the location and direction of the image would also be stored. When the image file information is displayed to the user a GPS database would be accessed and the displayed image file information would include the information from the name of the location and the direction of where the image was captured.

In another embodiment, the digital imaging device would contain a GPS device (204), a device to determine the direction, a clock, and a segment of a large GPS database. The segment of the large GPS database could be changed by uploading a new segment into the digital imaging device.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A digital imaging system comprising:
   a photo-sensor array configured to capture an image;
   an image storage area;
   a global positioning system that determines a location where the image is captured;
   at least one global positioning system database that provides a name of the location;
   a device to determine a direction when the image is captured;
   a processor that is configured to name the captured image file as a function of the name of the location and the direction the device was facing when the image was captured.

2. The system of claim 1 where the global positioning system database is a full database.

3. The system of claim 1 where the global positioning system database is a segment of a database.

4. The system of claim 1 where the global positioning system database can be changed.

5. The system of claim 1 where the global positioning system database is remote from the photo-sensor array.

6. The system of claim 1 where the name of the captured image file is substantially in the form of a sentence.

7. The system of claim 1 where the path of the captured image file is a function of the name of the location.

8. The system of claim 1 where the device to determine direction is a compass.

9. A digital imaging system comprising:
   a photo-sensor array configured to capture an image;
   an image storage area;
   a global positioning system that determines a location where the image is captured;
   at least one global positioning system data-base that provides a name of the location;
   a clock that determines when the image was captured;
   a device to determine a direction when the image is captured;
   a processor that is configured to name the captured image file as a function of the name of the location where the image was captured, when the image was captured, and the direction the digital Imaging system was facing when the image captured.

10. The system of claim 9 where the global positioning system database is a full database.

11. The system of claim 9 where the global positioning system database is a segment of a database.

12. The system of claim 9 where the global positioning system database can be changed.

13. The system of claim 9 where the global positioning system database is remote from the global positioning system.

14. The system of claim 9 where the name of the captured image file is substantially in the form of a sentence.

15. The system of claim 9 where the path of the captured image file is a function of the name of the location.

16. A method of storing images on a digital imaging device, comprising:

determining the location of the digital imaging device when the image is created;

determining the name of the location;

determining the direction the digital imaging device is facing when the image is created;

naming the stored image based on the name of the location and the direction.

17. The method of claim 16 where the name of the stored image is substantially in the form of a sentence.

18. The method of claim 16 where the path of the stored image is based on the name of the location.

19. A method of storing images on a digital imaging device, comprising:

determining the location of the digital imaging device when the image is created;

determining when the image is created determining the name of the location;

determining the direction the digital imaging device is facing when the image is created;

naming the stored image based on the name of the location, the direction and when the image was created.

\* \* \* \* \*

UNITED STATES PATENT AND TRADEMARK OFFICE
CERTIFICATE OF CORRECTION

PATENT NO. : 6,657,661 B1
DATED : December 2, 2003
INVENTOR(S) : Robert Cazier

It is certified that error appears in the above-identified patent and that said Letters Patent is hereby corrected as shown below:

Column 4,
Line 60, delete "Imaging" and insert therefor -- imaging --

Signed and Sealed this

Fifth Day of April, 2005

JON W. DUDAS
*Director of the United States Patent and Trademark Office*